May 7, 1957  G. E. PASCO  2,791,229

SELF-ROTATING BY-PASS VALVE

Filed Oct. 12, 1953

Inventor:
George E. Pasco
By: Joseph R. Dwyer
Atty.

United States Patent Office 2,791,229
Patented May 7, 1957

2,791,229

SELF-ROTATING BY-PASS VALVE

George E. Pasco, Cleveland Heights, Ohio, assignor to Borg-Warner Corporation, Chicago, Ill., a corporation of Illinois Application October 12, 1953, Serial No. 385,501

4 Claims. (Cl. 137—108)

This invention relates to fluid pressure responsive valves and more particularly for improvement in fluid pressure responsive valves utilizing a piston-like plunger reciprocable within a cylindrical chamber.

For purposes of illustration and in order to simplify the description of this invention, it is shown and described herein as incorporated in a flow control valve of the general type shown in the co-pending application of John A. Kanuch, Serial No. 17,177, filed March 26, 1948, now Patent No. 2,665,704 which flow control valve is adapted to maintain a fluid pressure utilizing device at a constant pre-determined operating speed regardless of the demand made on said utilizing device. It will be apparent, however, that the present invention is equally applicable and may be incorporated in other types of valves.

In prior art valves wherein there has been provided a reciprocable piston-like plunger valve responsive to fluctuations in fluid pressure, one difficulty encountered is that the reciprocable piston-like plunger valve is subject to static friction between the plunger valve and the walls of the chamber with which it cooperates. It is apparent that this static friction will cause erratic operation of the valve and resultant unreliable variations of the pressure being regulated.

Other difficulties, in prior art valves of the type described herein, are; the reciprocable plunger valves have certain lateral unbalance, they tend to become clogged due to impurities collected in the chamber and on the plunger itself, and they are subject to uneven wear; all of which contribute to their undesirability.

It has been found in practice that the one solution to the above mentioned difficulties is to provide a reciprocable plunger valve with concurrent rotary movement as it operates within a chamber. It is this rotary movement and the means of attaining same that this present invention is primarily directed.

Accordingly, it is a general object of the present invention to provide a new and improved type of reciprocable piston-like plunger valve which overcomes all of the aforementioned difficulties in prior art valves.

A particular object of this invention is to provide a means on piston-like plunger valves for overcoming the aforementioned static friction between the plunger and the chamber in which it reciprocates.

Another object of this invention is to provide a means which will reduce lateral balance in a piston-like plunger valve of the type described herein and which will cause the plunger to be self-cleaning and subject to more uniform wear during operation thereof.

Briefly, this invention can be described as a new and improved piston-like plunger valve responsive to fluid pressure, which is rotated as well as reciprocated by the action of this fluid pressure during operation thereof. This rotation is accomplished by providing one end of the plunger valve with means defining triangular flutes or indentations and, which when subjected to fluid pressure, cause the pressure responsive valve to rotate as it reciprocates. This rotary and reciprocable movement not only results in a reduction in the static friction between the plunger and its associated chamber but also results in causing the valve to become self-cleaning, increases lateral balance and subjects the valve to more even wear. This rotation is particularly important in a valve of the type herein contemplated where the end subject to pressure does not have a corresponding associated valve seat and static friction is primarily between the walls of the chamber of the sides of the plunger itself. Thus, a valve having these improvements will effect a more efficient operation and will be responsive to more minute fluctuations in pressure attaining more reliable pressure regulation.

Accordingly, a still further purpose of this invention is to provide a piston-like plunger valve with means defining triangular flutes or indentations which when subject to pressure will cause the plunger to rotate with respect to its associated chamber.

A further goal of the present invention is to provide a piston-like plunger valve of the type described herein which may function in a chamber without a valve seat to regulate pressure variations as will be hereinafter more fully explained, with triangular flutes or indentations which will cause the valve to rotate when subjected to pressure such that the static friction between the walls of the chamber and the plunger itself is substantially reduced.

Additional objects, features and advantages of the present invention will be apparent to persons skilled in the art as the operation and construction thereof are understood from the within description and are particularly pointed out in the claims.

One embodiment of the present invention is illustrated in the accompanying drawings which forms a part hereof and wherein.

Figure 1:
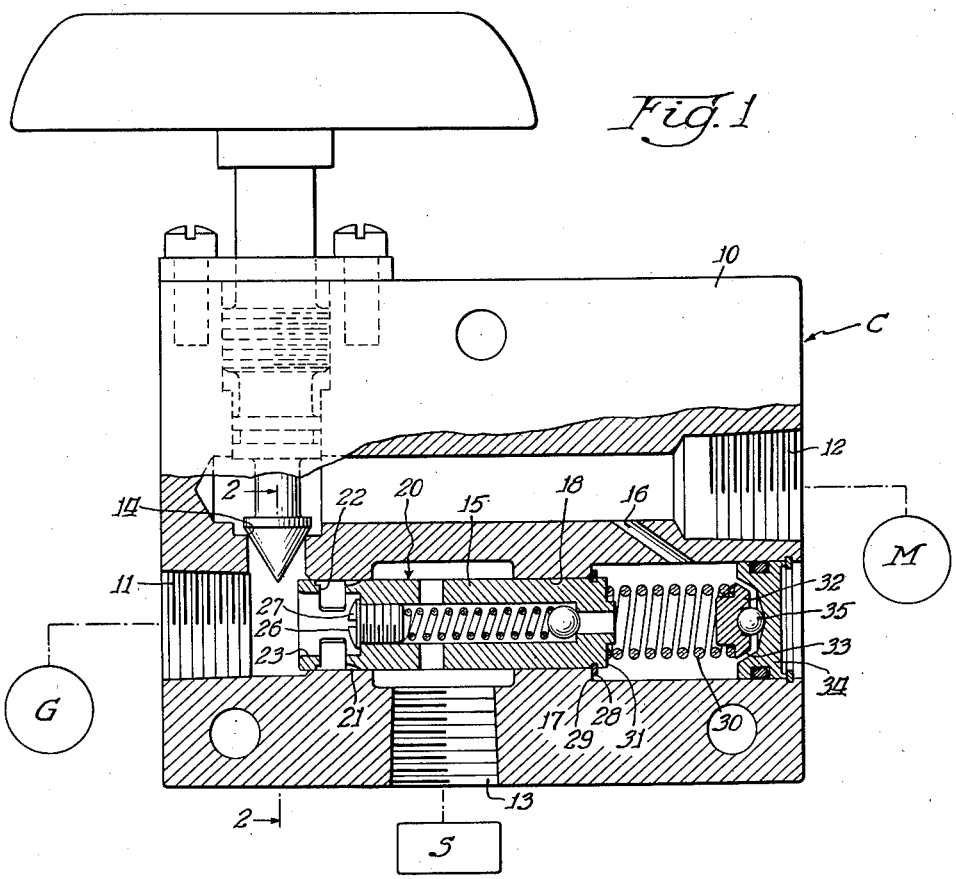
Fig. 1 is an axial, sectional view showing to advantage the piston-like plunger embodying the present invention and illustrated in a flow control valve together with a semi-schematic hydraulic system in which it may be incorporated.
Figure 2:
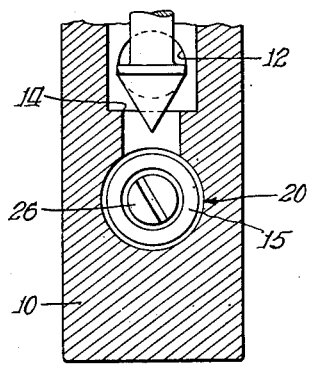
Fig. 2 is a transverse sectional view taken along line 2—2 of Fig. 1.

Referring now in greater detail to the drawings and particularly Fig. 1 thereof, the present invention has been illustrated by way of example, in a flow control valve assembly C comprising a housing 10 having an inlet passage 11 leading from pressure generator G, a first outlet passage 12 leading to a pressure responsive fixed displacement motor M and a second outlet bypass passage 13 communicating with sump S. Interposed between inlet 11 and the outlet 12 is a manually adjustable flow control orifice 14. This orifice is effective to produce a pressure drop between inlet 11 and outlet 12, which pressure drop is utilized to automatically control the operation of motor M.

As more fully described and illustrated in the aforementioned co-pending application of Kanuch Patent No. 2,665,704, by providing a suitable means for assuring a predetermined rate of fluid flow directed to the motor M due to the fixed displacement thereof, a substantially constant rate of rotation will result thereby, varying only by a small amount of slippage that may take place due to variations in back pressure on the motor. As further taught by the co-pending application of Kanuch Serial No. 17,177, this important function of the flow control valve is aided by the bypass valve assembly shown in the drawings herein and indicated in its entirety by numeral 20 having an axially reciprocable plunger valve 15 in combination with the manually adjustable flow control orifice 14, sump outlet passage 13, back pressure passage 16 and ball poppet valve assembly indicated in its entirety at 17.

Since this invention is directed primarily to the means of reducing the static friction between the plunger valve and the walls of the chamber by rotating the piston-like plunger 15 in the bypass valve assembly 20 and not in the constant flow control feature of the flow control valve assembly C, no further description of the latter is deemed necessary herein.

Figure 3:
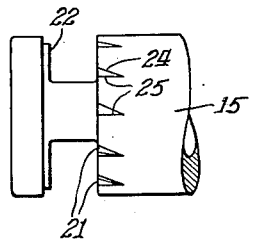
Fig. 3 is an enlarged detailed view showing to advantage the triangular flutes or indentations embodying the present invention.

Attention is now directed to the aforementioned primary feature of the present invention, namely, the rotary action of the plunger valve which has been found to be one solution of the problem of static friction that exists between the plunger itself and the walls of the chamber. As pressure from generator G acts upon the left end of the plunger to communicate the latter to the right, as viewed in Fig. 1, in the event said pressure exceeds a predetermined value, it can be seen in Fig. 1, and more advantageously in Fig. 3, that said plunger valve 15 has incorporated therein a plurality of identical indentations or flutes or triangular configuration which communicate with inlet passage 11 through a plurality of apertures 22 and recessed end portion 23; which indentations or flutes tend to urge the plunger valve in a rotary direction as will be more fully explained hereinbelow.

In this connection, due to the triangular configuration of the flutes 21 and, more specifically, due to the particular location of the sides 24 and 25 with respect to the axis of the plunger valve 15, sides 24 being offset on at an angle with respect to the axis of the plunger valve, and the particular location of the flutes with respect to the valve wall 18 and sump bypass outlet 13, fluid under excessive pressure will urge the plunger valve in a rotary manner concurrently as the pressure acts against the base 26 of recess 23 to urge the valve to the right. In this instance, the head of the adjusting retainer screw 27 is the base 26. It is apparent that when plunger 15 reaches a right hand position in chamber 18 where apertures 22 are in communication with sump outlet passage 13 pressure will be returned to sump S.

It should be noted that an outstanding aspect of the present invention is that it is particularly adaptable for use in piston-like plunger valves which lack a seating arrangement found in similar valves of this type. In other words, the use of flutes 21 is particularly adaptable for that type of valve wherein rotational movement should be produced to overcome sticking caused by the static friction between the walls of the chamber and the walls of the plunger itself as distinguished from that type of reciprocal valve which utilizes means of rotating the valve on its seat to prevent sticking between the valve seat and the one end of the plunger valve subject to pressure. Thus, in a plunger valve as shown and described herein, fluid under pressure is in open communication with the chamber walls 18 through recess 23 and apertures 22 in the extreme left hand position of the valve 15 which closes the inlet pressure 22 from sump bypass outlet 13. This extreme left position is fixed or determined by split ring assembly 28 seating against a ledge 29 and is urged thereagainst by coiled compression spring 30 having one end thereof seated against the right end portion 31 of plunger valve 15 and the other end thereof seated against a retaining assembly 32.

In order to facilitate the function of the flutes during operation of the valve, the retaining assembly 32 comprises a spring seat 33 and a closure plug 34 separated by ball bearing 35. Accordingly, plunger 15 and spring 30 may rotate freely because of the ball bearing action of ball 35 cooperating with seat 33 and plug 34. Obviously, the compression of spring 30 must be carefully selected to regulate the pressure at which the reciprocal plunger-like valve 15 will respond.

From the foregoing disclosure it can be seen that in the event pressure in inlet 11 exceeds a predetermined level, said pressure will act against the pressure-responsive base 26 of recess 23 and at the same time will act against the sides 24 and 25 of the triangular flutes 21 to not only reciprocate the valve to the right but also to rotate the same during this movement until the pressure is unloaded through bypass sump outlet passage 13. This rotational movement will not only rotate the valve itself but also the spring 30 due to the action of the ball bearing 35. This rotary action, it is evident, will not only reduce the static friction between the walls of the chamber and the plunger itself as the valve moves to the right, but also continued rotational movement by this plunger throughout the entire operation of this valve will cause the valve to become self-cleaning, will subject the same to more uniform wear, and produce more lateral balance.

Wherein the various parts of this invention have been referred to as being located in the right or left position, it will be understood that this is done solely for the purpose of facilitating description and that such references relate only to the relative positions of the parts as shown in the accompanying drawings.

While but one embodiment of this invention has been shown and described, it will be evident that many changes and modifications may be made therein without departing from the spirit or scope of the present invention, and while the present invention has been disclosed in connection with a flow control valve, it will be understood that this is by way of example and that the invention has a broad application wherever the equivalent problem exists, therefore, the present invention is to be defined by the appended claims which should be given an interpretation consistent with the state of the prior art.

What is claimed is:

1. A by-pass valve comprising a valve housing having a chamber formed therein and an inlet port leading to and an outlet port leading from said chamber, a valve member journaled in said chamber and having a piston surface formed thereon, said valve member being responsive to fluctuations in inlet pressure to reciprocate in said chamber and unload inlet pressure through said outlet port when said pressure reaches a predetermined pressure level, and means defining triangular flutes formed coaxially on the outer periphery of said valve member at the juncture of said piston surface and adjacent the chamber walls for rotating said valve member during reciprocation thereof, the reciprocation and rotation of the valve member occurring substantially simultaneously when pressure at and above said predetermined pressure level is applied thereto.

2. A by-pass valve comprising a valve housing having a chamber formed therein and an inlet port leading to and an outlet port leading from said chamber, a valve member journaled in said chamber and having a piston surface formed thereon, said valve member being responsive to fluctuations in inlet pressure to reciprocate in said chamber and unload inlet pressure through said outlet port when said pressure reaches a predetermined pressure level, means defining triangular flutes formed coaxially on the outer periphery on said valve member responsive to inlet pressure for rotating said valve member during reciprocation thereof, the reciprocation and rotation of the valve member occurring substantially simultaneously when pressure at and above said predetermined pressure level is applied thereto, and means including a compression spring member having a ball bearing assembly for allowing free rotation of said spring member during reciprocation of said valve member.

3. In a flow control valve arrangement comprising a housing having a first outlet, a second outlet and an inlet therein, means defining an adjustable orifice between said inlet and said first outlet to regulate the flow of pressure from said inlet to said first outlet, means defining a reciprocable by-pass valve located in a chamber between said inlet and said second outlet effective to divert varying portions of inlet pressure from passing through said adjustable orifice, said portions being related to the pressure in said first outlet whereby to cause the same to maintain substantially constant working outlet pressure, the improvement in said reciprocable by-pass valve comprising means defining triangular flutes formed coaxially on the outer periphery of said valve at the juncture of said piston surface and adjacent the chamber walls for rotating said valve during reciprocation thereof, the reciprocation and rotation of the valve member occurring substantially simultaneously when pressure in excess of constant working pressure is applied thereto.

4. In a flow control valve arrangement comprising a housing having a first outlet, a second outlet and an inlet therein, means defining an adjustable orifice between said inlet and said first outlet to regulate the flow of pressure from said inlet to said first outlet, means defining a reciprocable by-pass valve located in a chamber between said inlet and said second outlet effective to divert varying portions of inlet pressure from passing through said adjustable orifice, said portions being related to the pressure in said first outlet whereby to cause the same to maintain substantially constant working pressure, the improvement in said reciprocable by-pass valve comprising means defining triangular flutes formed coaxially on the outer periphery of said valve member responsive to inlet pressure for rotating said valve during reciprocation thereof, the reciprocation and rotation of the valve member occurring substantially simultaneously when pressure in excess of constant working pressure is applied thereto and means including a compression spring member having a ball bearing assembly for allowing free rotation of said spring member during reciprocation of said valve.

References Cited in the file of this patent

UNITED STATES PATENTS

| | | |
|---|---|---|
| 1,418,911 | Garlick | June 6, 1922 |
| 1,426,560 | Fisher | Aug. 22, 1922 |
| 1,659,498 | Ruthven | Feb. 14, 1928 |
| 2,077,716 | Sandlin | Apr. 20, 1937 |
| 2,359,017 | Balsiger | Sept. 26, 1944 |
| 2,665,704 | Kanuch | Jan. 12, 1954 |